(12) United States Patent
Chuang et al.

(10) Patent No.: US 11,749,473 B2
(45) Date of Patent: Sep. 5, 2023

(54) KEYBOARD MODULE AND KEYBOARD DEVICE

(71) Applicants: LITE-ON ELECTRONICS (GUANGZHOU) LIMITED, Guangzhou (CN); Lite-On Technology Corporation, Taipei (TW)

(72) Inventors: Wei-Pin Chuang, Taipei (TW); Min-Chuan Shao, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/876,112

(22) Filed: May 17, 2020

(65) Prior Publication Data

US 2021/0287861 A1 Sep. 16, 2021

(30) Foreign Application Priority Data

Mar. 13, 2020 (CN) .......................... 202010174112.4

(51) Int. Cl.
*H01H 13/84* (2006.01)
*H01H 13/705* (2006.01)
(Continued)

(52) U.S. Cl.
CPC .......... *H01H 13/84* (2013.01); *H01H 13/705* (2013.01); *H01H 13/83* (2013.01); *H04R 1/08* (2013.01)

(58) Field of Classification Search
CPC ...... H01H 13/84; H01H 13/705; H01H 13/83; H04R 1/08
See application file for complete search history.

(56) References Cited

U.S. PATENT DOCUMENTS

| 5,717,430 A * | 2/1998 | Copland | ................. G06F 3/021 D14/398 |
| 6,935,797 B2 * | 8/2005 | Sim | ......................... G06F 3/021 400/477 |

(Continued)

FOREIGN PATENT DOCUMENTS

| CN | 206906990 | 1/2018 |
| CN | 207424810 | 5/2018 |
| CN | 208805783 | 4/2019 |

OTHER PUBLICATIONS

CN102137321, Fang et al., machine translation attached. (Year: 2011).*

(Continued)

*Primary Examiner* — Kyung S Lee
(74) *Attorney, Agent, or Firm* — JCIPRNET

(57) ABSTRACT

The invention provides a keyboard module and a keyboard device. The keyboard module includes a circuit assembly, a plurality of key assemblies, and at least one microphone. The circuit assembly has a signal output interface. The key assemblies are configured on the circuit assembly, and each key assembly is adapted to be pressed to drive the circuit assembly to generate a tapping signal. The microphone is electrically connected to the circuit assembly. The tapping signal and a sound signal generated by the microphone are respectively transmitted out of the keyboard module through the signal output interface.

4 Claims, 10 Drawing Sheets

(51) Int. Cl.
*H01H 13/83* (2006.01)
*H04R 1/08* (2006.01)

(56) References Cited

U.S. PATENT DOCUMENTS

| | | | | |
|---|---|---|---|---|
| 7,519,186 B2* | 4/2009 | Varma | .................. | G06F 1/1688 |
| | | | | 381/94.1 |
| 8,867,757 B1* | 10/2014 | Ooi | ...................... | G06F 3/0219 |
| | | | | 381/91 |
| 10,649,529 B1* | 5/2020 | Nekimken | ............ | G06F 1/1688 |
| 2001/0032779 A1* | 10/2001 | Davidson | ............. | H01H 13/705 |
| | | | | 200/341 |
| 2007/0286407 A1* | 12/2007 | Takahashi | ........... | H04M 1/6025 |
| | | | | 379/413.03 |
| 2008/0051032 A1* | 2/2008 | Hashimoto | ........... | H04M 1/737 |
| | | | | 455/41.3 |
| 2009/0041270 A1* | 2/2009 | Schrank | .................. | H04R 7/10 |
| | | | | 381/174 |
| 2009/0160681 A1* | 6/2009 | Chen | ...................... | G06F 3/021 |
| | | | | 341/23 |
| 2015/0185869 A1* | 7/2015 | Chng | .................. | H03K 17/955 |
| | | | | 345/168 |
| 2015/0268738 A1* | 9/2015 | Song | ...................... | H05K 1/184 |
| | | | | 345/168 |
| 2016/0048217 A1* | 2/2016 | Sakita | ..................... | H01H 13/84 |
| | | | | 345/169 |
| 2016/0086745 A1* | 3/2016 | Seo | ....................... | H01H 13/063 |
| | | | | 200/51 R |

OTHER PUBLICATIONS

"Office Action of China Counterpart Application", dated Feb. 10, 2023, pp. 1-6.

* cited by examiner

KEYBOARD MODULE AND KEYBOARD DEVICE

CROSS-REFERENCE TO RELATED APPLICATION

This application claims the priority benefit of China application serial no. 202010174112.4, filed on Mar. 13, 2020. The entirety of the above-mentioned patent application is hereby incorporated by reference herein and made a part of this specification.

BACKGROUND OF THE INVENTION

1. Field of the Invention

The invention relates to a keyboard module and a keyboard device.

2. Description of Related Art

With the advances in technology, many voice assistant programs have been developed, such as APPLE's SIRI®, GOOGLE's GOOGLE NOW™, MICROSOFT's CORTANA®, or AMAZON's ALEXA®. Users can use portable electronic devices such as mobile phones, tablets, or laptops to conduct direct voice conversations with voice assistants.

One of the necessary components for completing the above-mentioned voice conversation is a microphone configured on the portable electronic device so that the sound generated by a user from any position relative to the portable electronic device can be accurately transmitted to the portable electronic device through the configuration of the microphone.

However, as portable electronic devices are trending toward thinner and lighter designs, the configuration of the above-mentioned microphone is also becoming limited. Taking a notebook computer as an example, when the appearance of the display screen is designed with a narrow bezel, it also means that the body does not have enough space at the display screen to configure a microphone. Accordingly, those skilled in the art would need to provide a feasible alternative for the above configuration so that the portable electronic device can have both the appearance effect and the voice conversation function.

SUMMARY OF THE INVENTION

The invention provides a keyboard module which includes a plurality of key assemblies and a microphone, and signals of the key assembly and the microphone are output through a signal output interface of a circuit assembly.

According to an embodiment of the invention, the keyboard module includes a circuit assembly, a plurality of key assemblies, and at least one microphone. The circuit assembly has a signal output interface. The key assemblies are configured on the circuit assembly, and each key assembly is adapted to be pressed to drive the circuit assembly to generate a tapping signal. The microphone is electrically connected to the circuit assembly. The tapping signal and a sound signal generated by the microphone are respectively transmitted out of the keyboard module through the signal output interface.

According to an embodiment of the invention, the keyboard device includes a housing and a keyboard module assembled in the housing. The keyboard module includes a circuit assembly, a plurality of key assemblies, and at least one microphone. The circuit assembly has a signal output interface. The key assemblies are configured on the circuit assembly, and each key assembly is adapted to be pressed to drive the circuit assembly to generate a tapping signal. The microphone is electrically connected to the circuit assembly. The tapping signal and a sound signal generated by the microphone are transmitted out of the keyboard module through the signal output interface.

In the keyboard module according to the embodiment of the invention, the circuit assembly includes a thin film circuit which is electrically connected to the signal output interface, and the key assemblies and the microphone are configured on the thin film circuit.

In the keyboard module according to an embodiment of the invention, the circuit assembly includes a printed circuit board which is electrically connected to the signal output interface, and the key assemblies and the microphone are configured on the printed circuit board.

In the keyboard module according to an embodiment of the invention, the circuit assembly includes a thin film circuit and a flexible circuit board (FPC), the key assemblies are configured on the thin film circuit, the microphone is configured on the flexible circuit board, and the thin film circuit is electrically connected to the signal output interface. The microphone is electrically connected to the thin film circuit through the flexible circuit board, or the microphone is electrically connected to the signal output interface through the flexible circuit board.

In the keyboard module according to an embodiment of the invention, the microphone has a discrete package structure including a microphone unit and an individual electronic board combined with each other.

In the keyboard module according to an embodiment of the invention, the keyboard module further includes a substrate, and the above-mentioned circuit assembly includes a thin film circuit, the thin film circuit is configured on the substrate, and the above-mentioned individual electronic board is fixed between the thin film circuit and the substrate.

In the keyboard module according to an embodiment of the invention, the keyboard module further includes a substrate, and the individual electronic board is configured on the thin film circuit and is located opposite to the substrate.

In the keyboard module according to an embodiment of the invention, the keyboard module further includes a substrate, a light-emitting component, and an optical component, the circuit assembly includes a first circuit and a second circuit, the key assemblies are configured on the first circuit, and the light-emitting component is configured on the second circuit. The first circuit and the second circuit are configured on opposite surfaces of the substrate, and the individual electronic board is fixed between the substrate and the optical component.

Based on the above, in the keyboard module and the keyboard device having the keyboard module, the circuit assembly having the key assemblies are electrically connected to at least one microphone, so that the tapping signals of the key assemblies driving the circuit assembly and the sound signal generated by the microphone can all be output out of the keyboard module through the signal output interface of the circuit assembly. In this way, the microphone is formed as a built-in electronic component of the keyboard module. Accordingly, for the keyboard device having the keyboard module or the electronic device using the keyboard module, there is no need to separately configure an additional microphone in the body or the housing of the electronic device, thereby the available space of the body is increased and the voice conversation function of the electronic device is not affected by limited space.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
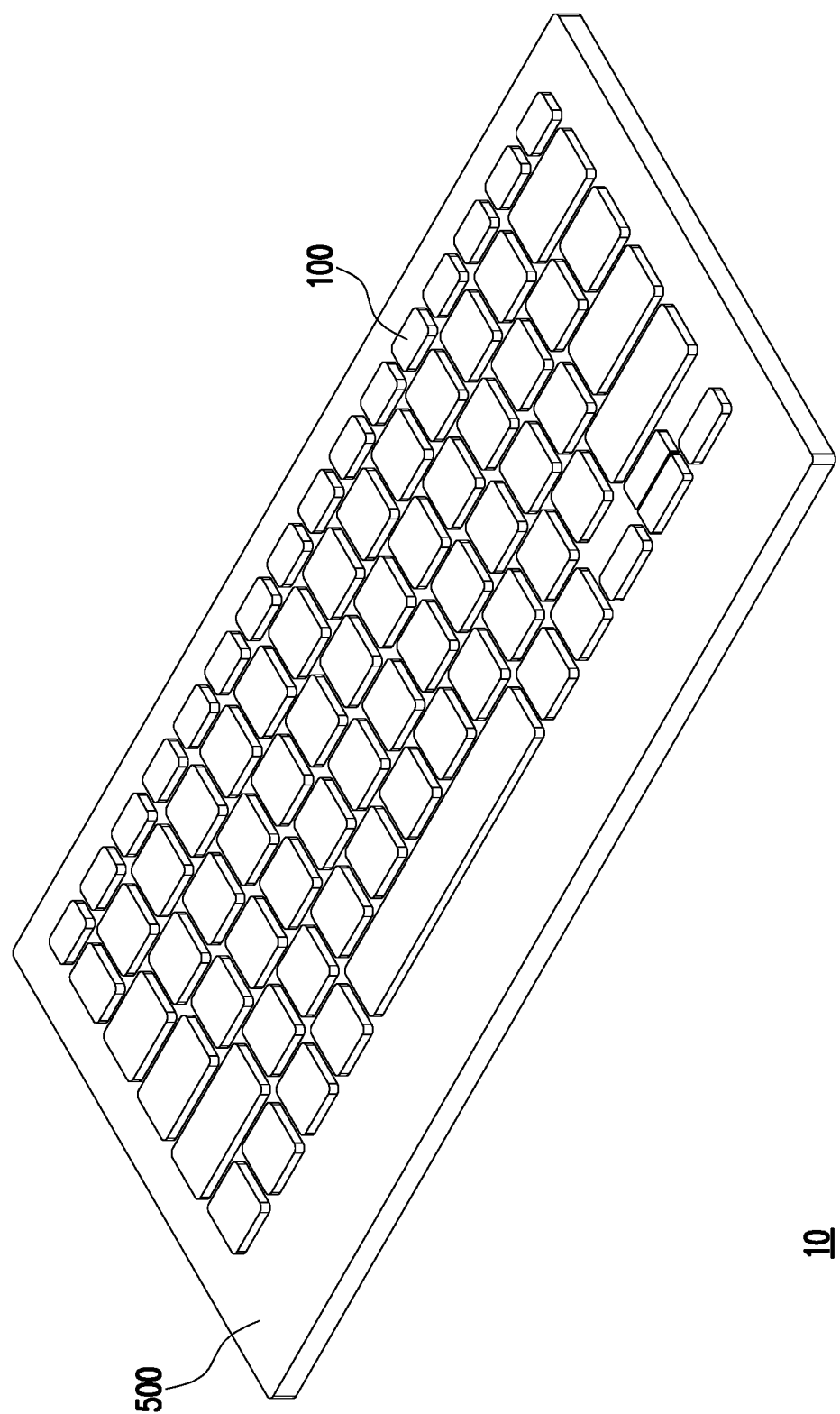
FIG. 1 is a schematic view of the keyboard device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is the schematic view of a keyboard device according to an embodiment of the invention. Referring to FIG. 1, in this embodiment, a keyboard device 10 includes a housing 500 and a keyboard module 100 combined with the housing 500. Here, the keyboard device 10 may be a host of a notebook computer or an expansion body for combining with a tablet computer, and the application object may be changed according to requirements, which is not limited in this embodiment. The keyboard module 100 is configured in the housing 500 to provide relevant electronic devices with a signal input function.

Figure 2A:
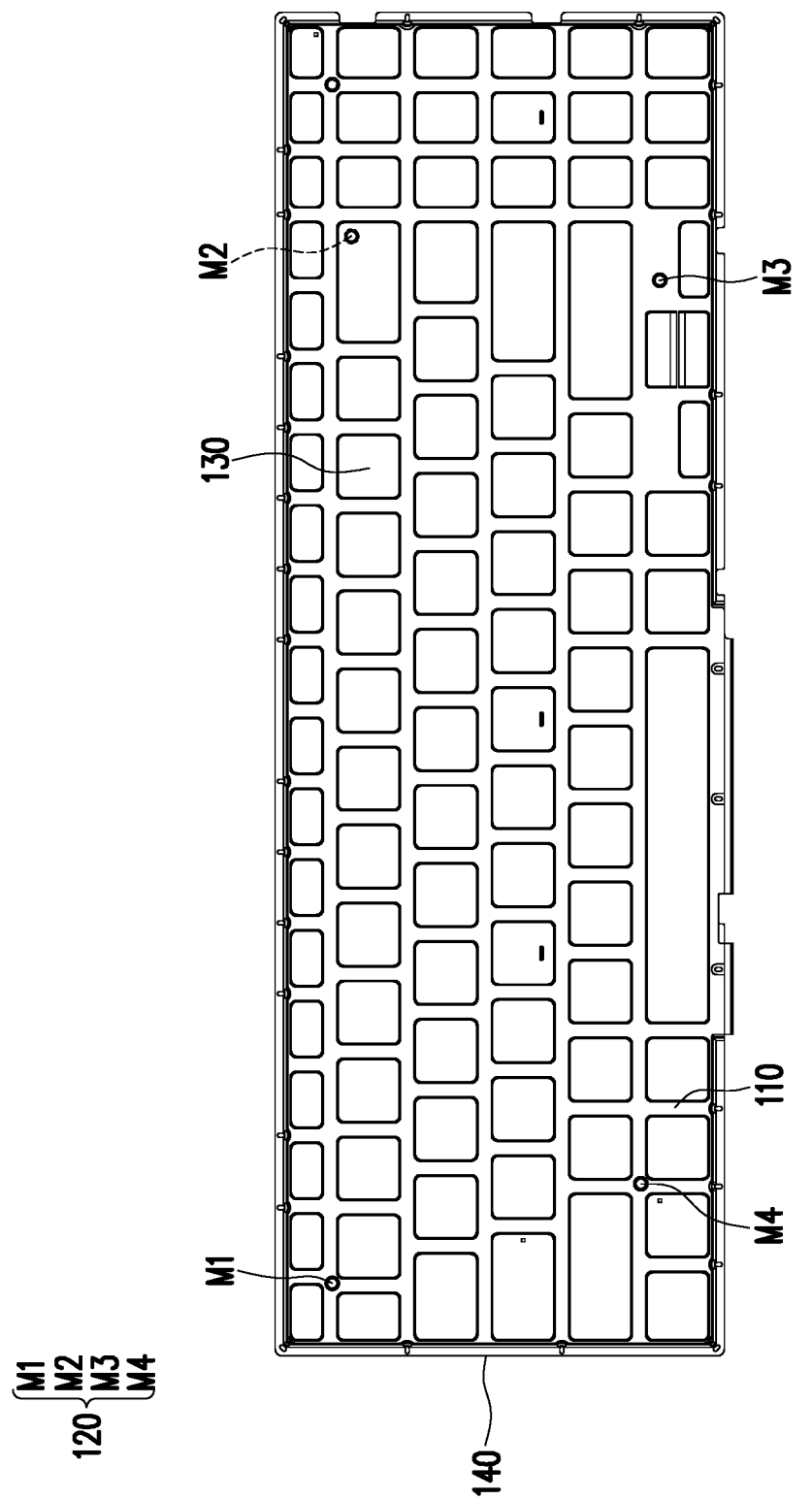
FIG. 2A is a top view of the keyboard module of FIG. 1.
Figure 2B:
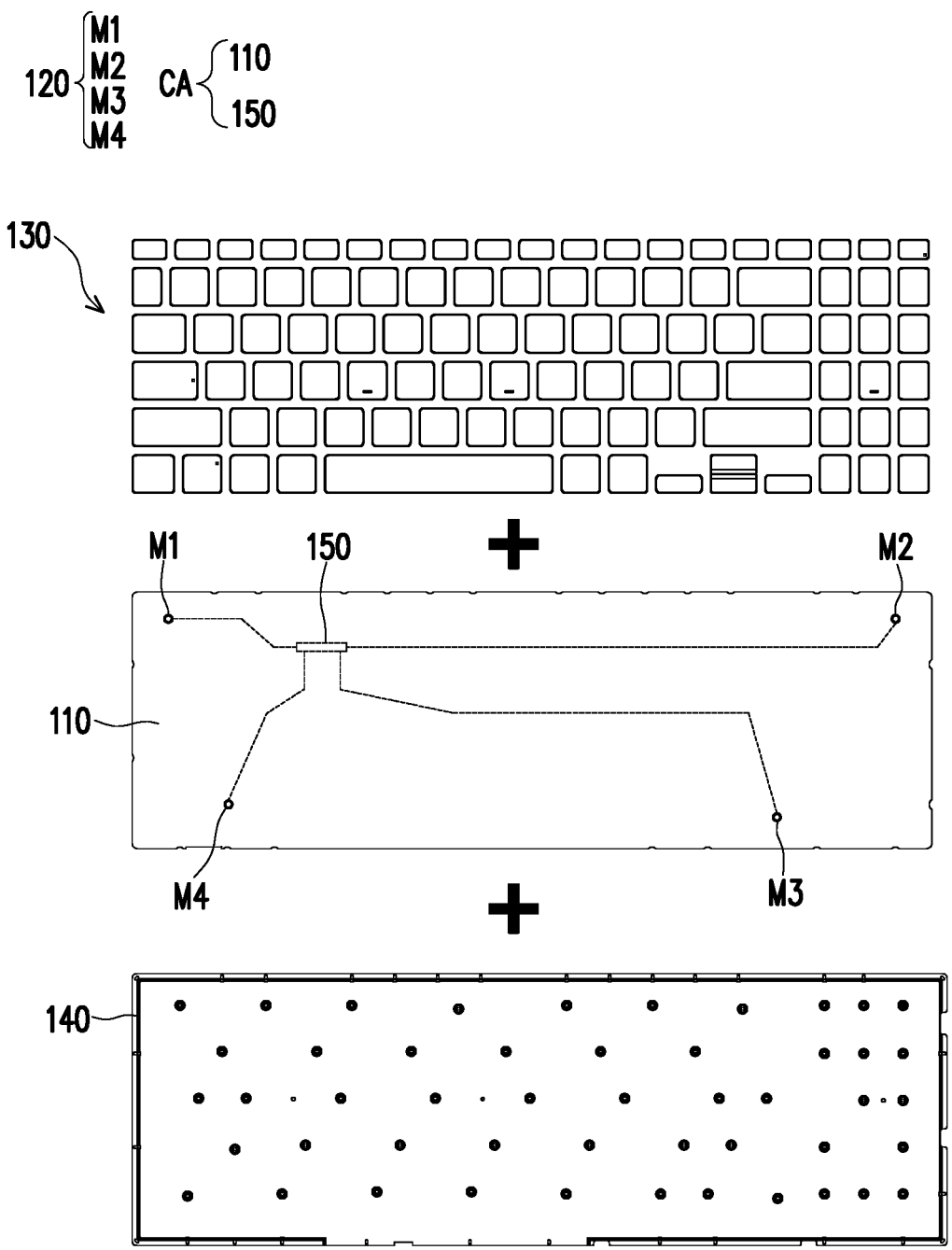
FIG. 2B is a schematic view of the composition of the keyboard module of FIG. 2A.
Figure 2C:
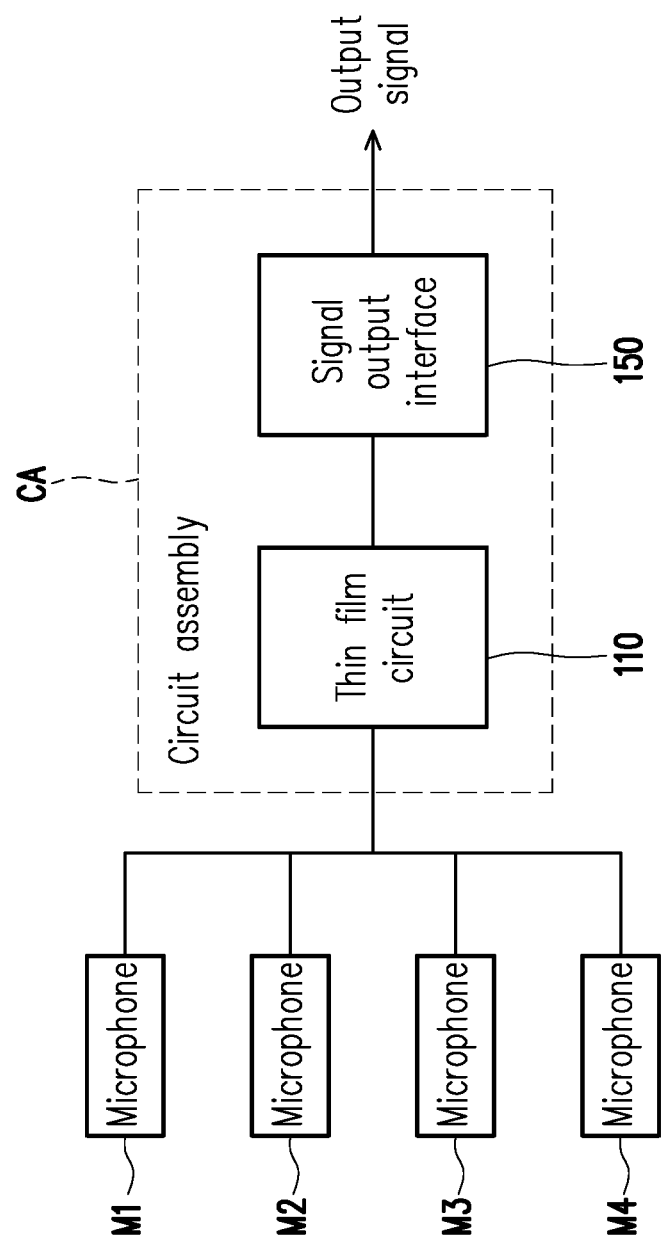
FIG. 2C is a schematic view of electrical connection of related components in the keyboard module of FIG. 2A.

FIG. 2A is a top view of the keyboard module of FIG. 1. FIG. 2B is a schematic view of the composition of the keyboard module of FIG. 2A. FIG. 2C is a schematic view of electrical connection of related components in the keyboard module of FIG. 2A. Referring to FIG. 2A to 2C, in this embodiment, the keyboard module 100 includes a circuit assembly CA, a plurality of key assemblies 130, a substrate 140, and at least one microphone. In this embodiment, the sound receiving array 120 formed by the four microphones M1 to M4 is shown as an example, but the invention is not limited thereto.

As shown in FIG. 2B, the key assemblies 130, the circuit assembly CA, and the substrate 140 are sequentially stacked. The key assemblies 130 are configured on the circuit assembly CA, and the key assemblies 130 are adapted to be pressed to drive the circuit assembly CA to generate tapping signals. The microphones M1 to M4 are electrically connected to the circuit assembly CA, and the tapping signals and the sound signals generated by the microphones M1 to M4 are respectively transmitted out of the keyboard module 100 through the signal output interface 150 of the circuit assembly CA. Taking a notebook computer as an example, the signal output interface 150 of the keyboard module 100 is connected to a main circuit board (not shown) in the host, so that the tapping signals and sound signals can be transmitted to the main circuit board to complete necessary control means.

In other words, in the related art, the key assemblies 130 are pressed to drive the circuit assembly CA to generate a tapping signal and transmit the tapping signal through the signal output interface 150. The invention further integrates the tapping signal and the sound signal to be transmitted from the signal output interface 150 by electrically connecting the microphones M1 to M4 to the circuit assembly CA of the keyboard module 100. Accordingly, the microphones M1 to M4 are arranged as the built-in electronic components of the keyboard module 100. In this way, the designers of technologies relating to the keyboard device 10 or the electronic device using the keyboard module 100 can effectively reduce the technical difficulty and complexity of having to incorporate additional microphones or sound receiving components. That is, the keyboard device 10 or the electronic device using the keyboard module 100 is no longer limited by the space configuration in the housing 500 (or the body), thereby the design process of the keyboard device 10 or the portable electronic device is simplified.

Figure 2D:
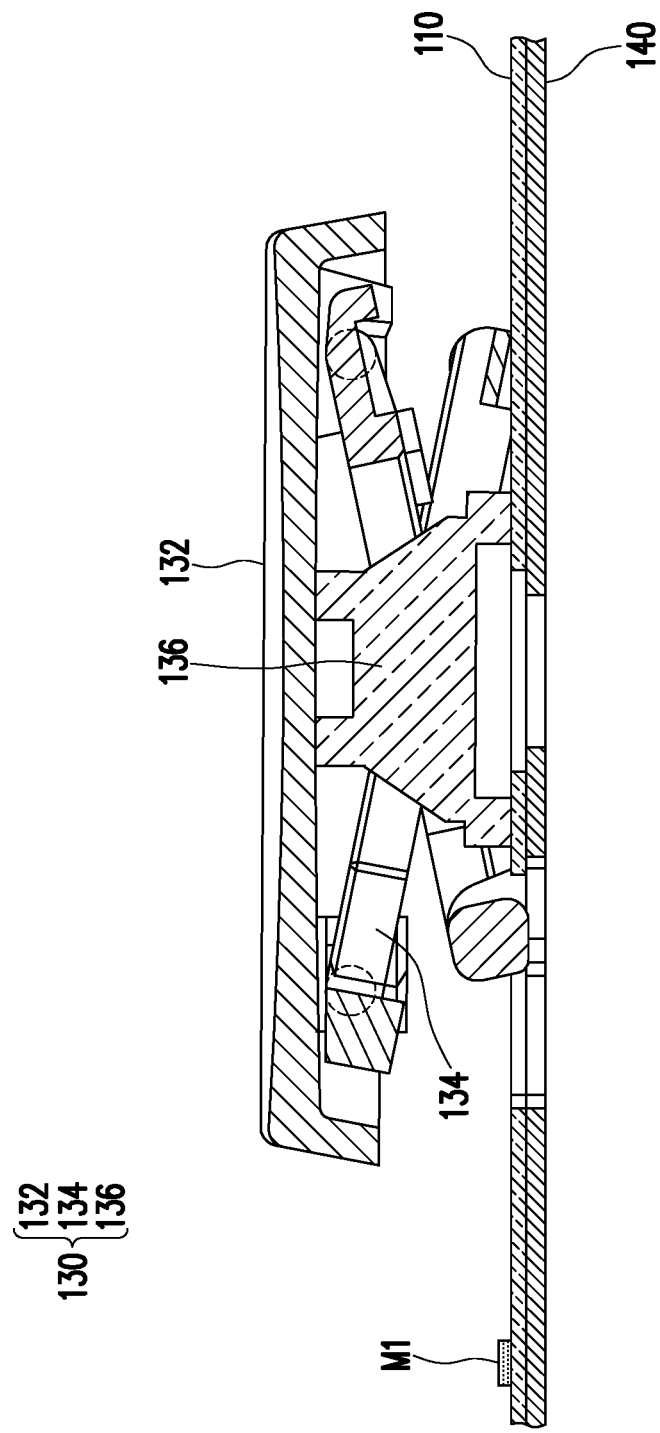
FIG. 2D is a partial sectional view of the keyboard module of FIG. 2A.

FIG. 2D is a partial sectional view of the keyboard module of FIG. 2A. Referring to FIG. 2B to FIG. 2D, in this embodiment, the circuit assembly CA includes a thin film circuit 110 configured on the substrate 140, and the microphones M1 to M4 are configured on the thin film circuit 110. The key assembly 130 includes a keycap 132, a transmission member 134, and an elastic member 136. The keycap 132 is adapted to be pressed to drive the transmission member 134 and the elastic member 136, thereby driving a touch electrode (not shown) in the thin film circuit 110 to be electrically conductive and generate a tapping signal, then the tapping signal may be transmitted to the signal output interface 150 via the circuit to be transmitted out of the keyboard module 100.

Moreover, in addition to generating the tapping signal, the thin film circuit 110 of this embodiment also provides a function of electrical signal transmission between the microphones M1 to M4 and the signal output interface 150, so that the sound signals generated by the microphones M1 to M4 are also transmitted to the signal output interface 150 via the thin film circuit 110 to be transmitted out of the keyboard module 100. Accordingly, the thin film circuit 110 may serve as an electrical bridge between the microphones M1 to M4 and the key assembly 130 at the same time. In other words, during the manufacturing process, the thin film circuit 110 of this embodiment is packaged with a microphone and a corresponding transmission circuit at the same time, so the microphones M1 to M4 are formed as the built-in electronic components of the keyboard module 100.

It should also be noted that the number of the microphones M1 to M4 and their positions on the thin film circuit 110 and the corresponding relationship between the microphones M1 to M4 and the key assemblies 130 shown in this embodiment are merely examples, and the invention does not intend to impose limitations on this regard. That is, the designer may configure or arrange the number and array of these microphones on the thin film circuit 110 according to the required conditions.

In addition, in another embodiment not shown herein, the circuit assembly includes a printed circuit board, and the microphones M1 to M4 are configured on the printed circuit board. Such configuration can also achieve the effects provided by the above-mentioned embodiments.

Figure 3:
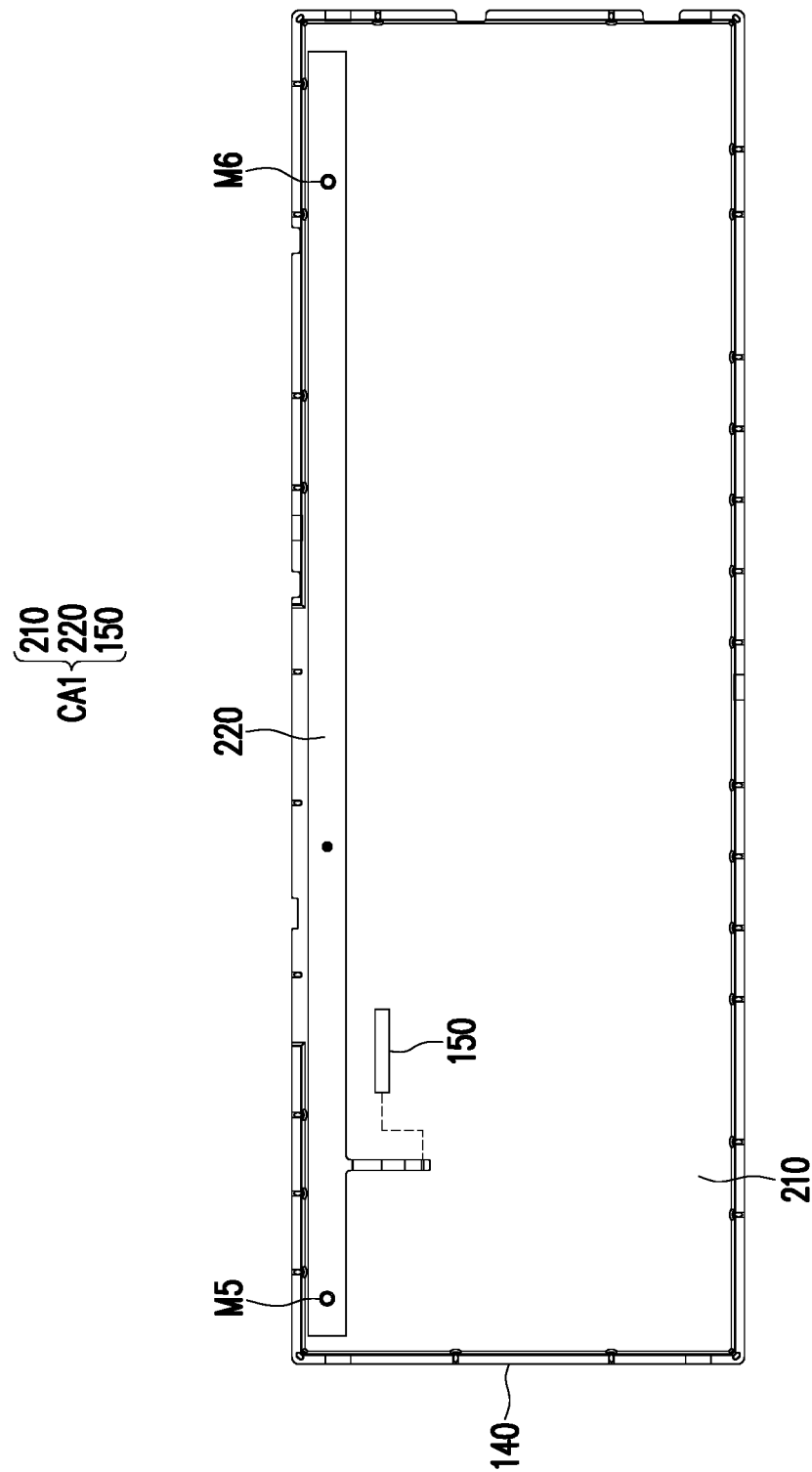
FIG. 3 is a top view of some components of a keyboard module according to another embodiment of the invention.

FIG. 3 is a top view of some components of a keyboard module according to another embodiment of the invention. Referring to FIG. 3 in which the key assemblies are omitted to facilitate identification of related component features. In this embodiment, the circuit assembly CA1 includes a thin film circuit 210 and a flexible circuit board (FPC) 220, and the microphones M5 and M6 are configured on the flexible circuit board 220, electrically connected to the thin film circuit 210 through the flexible circuit board 220, and then electrically connected to the signal output interface 150. In the embodiment, by making use of the flexible characteristic of the flexible circuit board 220, the microphones M5 and M6 can be more flexibly configured at desired positions, thereby providing the designer with more configuration options, and is therefore not limited by the circuit configuration of the thin film circuit 210. Although a circuit for bridging the flexible circuit board 220 and the signal output interface 150 is still required in the thin film circuit 210 provided herein, in another embodiment not shown, the flexible circuit board 220 may also be directly connected to the signal output interface 150.

Figure 4:
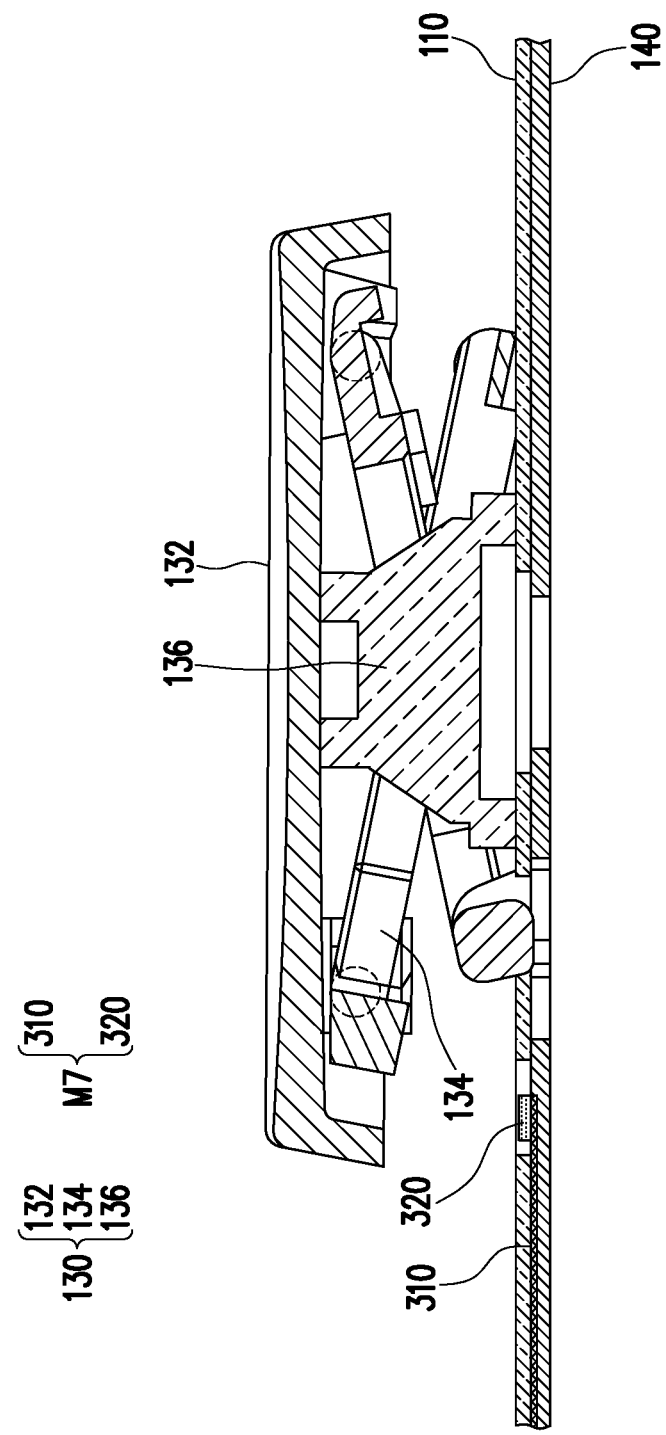
FIG. 4 is a partial sectional view of a keyboard module according to another embodiment of the invention.

FIG. 4 is a partial sectional view of a keyboard module according to another embodiment of the invention. Referring to FIG. 4, unlike the above-mentioned embodiment, a microphone M7 of this embodiment has a discrete package structure, that is, a microphone unit 320 is directly configured on an individual electronic board 310, and the individual electronic board 310 does not integrate other electronic components and may be regarded as a one-to-one structure with the microphone unit 320. Unlike the above-mentioned embodiments in which the microphone unit is directly configured on a thin film circuit, a flexible circuit board or a printed circuit board, through the discrete packaging structure, the microphone M7 can be completed in advance and the influence on the process of the thin film circuit can be reduced. Further, the keyboard module of this embodiment also includes the substrate 140 and the thin film circuit 110 configured thereon, and the individual electronic board 310 is fixed between the thin film circuit 110 and the substrate 140. In other words, in this embodiment, the microphone unit 320 is first configured on the individual electronic board 310, and then the completed microphone M7 is configured at a desired position when the thin film circuit 110 is being manufactured. This provides another means of microphone configuration, which can also achieve the same effect as the previous embodiments.

On the other hand, in an embodiment not shown, the individual electronic board 310 of the microphone M7 may also be directly configured on the thin film circuit 110 and located opposite to the substrate 140, that is, the thin film circuit 110 is located between the substrate 140 and the individual electronic board 310.

Figure 5A:
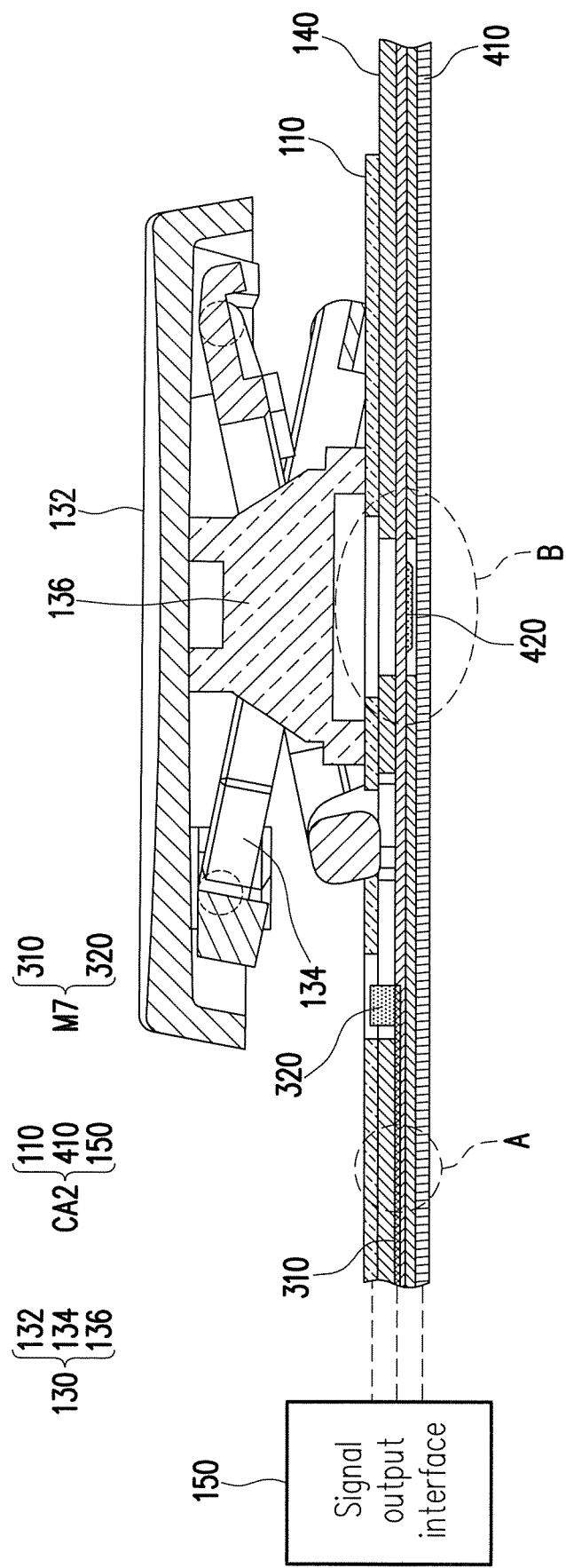
FIG. 5A is a partial sectional view of a keyboard module according to another embodiment of the invention.
Figure 5B:
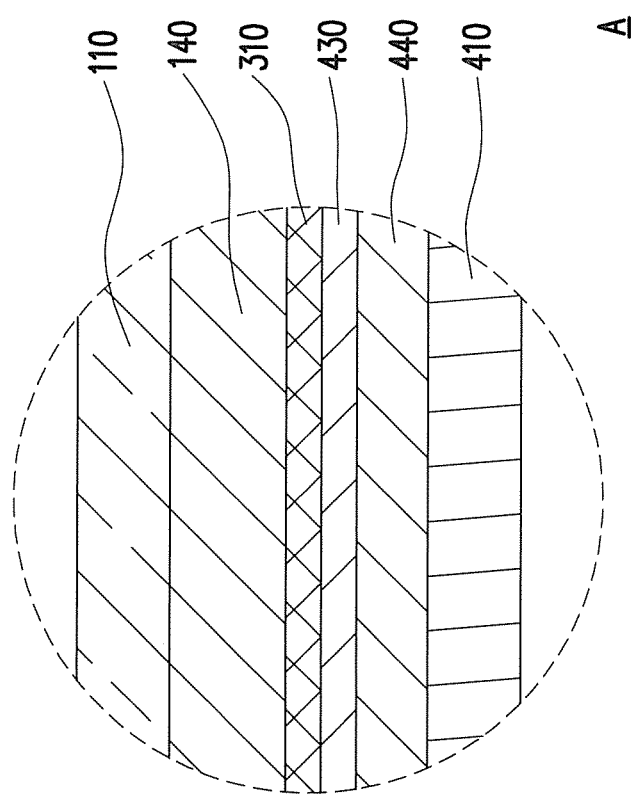
FIG. 5B is an enlarged view of a region A of the keyboard module of FIG. 5A.
Figure 5C:
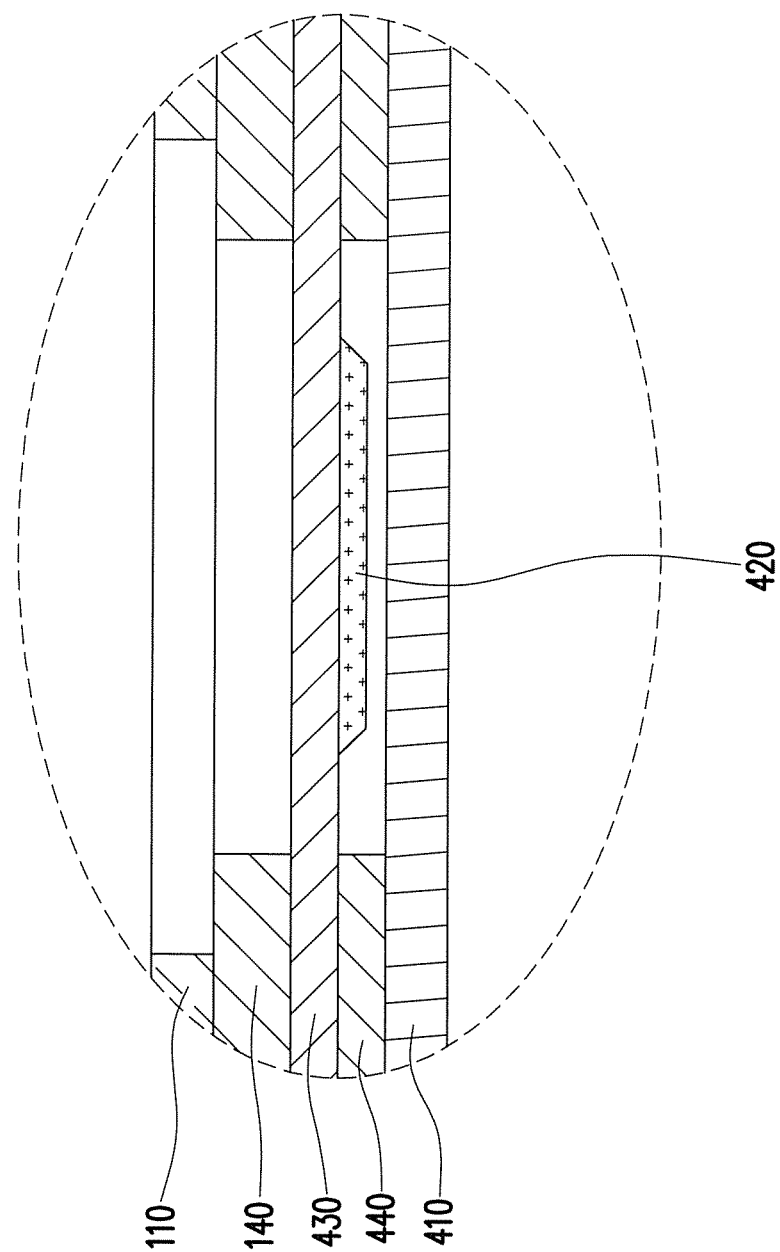
FIG. 5C is an enlarged view of a region B of the keyboard module of FIG. 5A.

FIG. 5A is a partial sectional view of a keyboard module according to another embodiment of the invention. FIG. 5B is an enlarged view of a region A of the keyboard module of FIG. 5A. FIG. 5C is an enlarged view of a region B of the keyboard module of FIG. 5A. Referring to FIG. 5A to FIG. 5C, in this embodiment, in addition to the same key assemblies 130, substrate 140, and thin film circuit 110 as those in the above-mentioned embodiments, the keyboard module also includes a light-emitting component (LED) 420 and an optical component which includes a diffuser 430 and a reflector 440, and a circuit assembly CA2 of this embodiment includes a first circuit, a second circuit 410, and the signal output interface 150. The first circuit refers to the thin film circuit 110 of the above-mentioned embodiments, and the second circuit 410 may be a thin film circuit or a printed circuit board or a flexible circuit board.

Here, the key assembly 130 is also configured on the thin film circuit 110, the light-emitting component 420 on the second circuit 410, and the microphone M7 also has a discrete package structure. As shown in FIG. 5B, the thin film circuit 110, the substrate 140, the individual electronic board 310, the diffuser 430, the reflector 440, and the second circuit 410 are sequentially stacked together, that is, the thin film circuit 110 and the second circuit 410 are substantially located on opposite surfaces of the substrate 140, and the individual electronic board 310 is fixed between (the diffuser 430 of) the optical component and the substrate 140.

In summary, in the keyboard module and the keyboard device according to the embodiments of the invention, the circuit assembly having the key assemblies are electrically connected to at least one microphone, so that the tapping signals of the key assemblies driving the circuit assembly and the sound signal generated by the microphone can all be output out of the keyboard module through the signal output interface of the circuit assembly. In this way, the microphone is formed as a built-in electronic component of the keyboard module.

Further, under the premise that the microphone and the key assemblies share the signal output interface, the designer may configure the microphone in the circuit assembly by different means, such as configuring the microphone on a thin film circuit or a printed circuit board of the circuit assembly, or even electrically connecting the microphone to a thin film circuit or a signal output interface through the flexible circuit board. At the same time, as the forming structure of the microphone is changed, such as to a discrete package structure, more options can be further provided for the configuration of microphone location.

Accordingly, for the keyboard device having a keyboard module or the electronic device using the keyboard module, there is no need to separately configure an additional microphone in the body or the housing of the electronic device, thereby the available space of the body is increased and the voice conversation function of the electronic device is not affected by limited space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard module, comprising:
   a circuit assembly having a signal output interface, and a thin film circuit electrically connected to the signal output interface;
   at least one key assembly configured on the circuit assembly, and adapted to be pressed to drive the circuit assembly to generate a tapping signal; and
   at least one microphone directly disposed on and electrically connected to the circuit assembly, wherein a sound signal generated by the microphone and the tapping signal are respectively transmitted out of the keyboard module through the signal output interface, and the signal output interface and the microphone are overlapped with the key assembly when viewed from a direction normal to a top surface of the keyboard module, wherein the key assembly and the microphone are configured in the thin film circuit.

2. The keyboard module according to claim 1, wherein the microphone has a discrete package structure comprising a microphone unit and an individual electronic board combined with each other.

3. A keyboard device, comprising:
- a housing;
- a keyboard module assembled in the housing, wherein the keyboard module comprises:
- a circuit assembly having a signal output interface, and a thin film circuit electrically connected to the signal output interface;
- a plurality of key assemblies configured on the circuit assembly, each being adapted to be pressed to drive the circuit assembly to generate a tapping signal; and
- at least one microphone directly disposed on and electrically connected to the circuit assembly, wherein a sound signal generated by the microphone and the tapping signal are respectively transmitted out of the keyboard module through the signal output interface, and the signal output interface and the microphone are overlapped with the key assemblies when viewed from a direction normal to a top surface of the keyboard module, wherein the key assembly and the microphone are configured in the thin film circuit.

4. The keyboard device according to claim 3, wherein the microphone has a discrete package structure comprising a microphone unit and an individual electronic board combined with each other.

* * * * *